(12) United States Patent
Marumo et al.

(10) Patent No.: US 10,453,634 B2
(45) Date of Patent: Oct. 22, 2019

(54) POWER GENERATION APPARATUS AND WIRELESS SWITCH

(71) Applicant: OMRON Corporation, Kyoto-shi, Kyoto (JP)

(72) Inventors: Katsuya Marumo, Otsu (JP); Ken Tamura, Matsue (JP); Kazuyuki Tsukimori, Okayama (JP); Hiroshi Shiino, Otsu (JP); Yasushi Kawashima, Kusatsu (JP); Hajime Umeki, Kyoto (JP); Junji Obata, Osaka (JP); Keisuke Yano, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 148 days.

(21) Appl. No.: 15/787,898

(22) Filed: Oct. 19, 2017

(65) Prior Publication Data
US 2018/0158632 A1    Jun. 7, 2018

(30) Foreign Application Priority Data

Dec. 7, 2016    (JP) ................. 2016-237418

(51) Int. Cl.
| | |
|---|---|
| *H01H 47/00* | (2006.01) |
| *H02J 50/20* | (2016.01) |
| *G05G 1/02* | (2006.01) |
| *H01H 13/22* | (2006.01) |
| *H02K 35/02* | (2006.01) |

(Continued)

(52) U.S. Cl.
CPC .............. *H01H 47/00* (2013.01); *G05G 1/02* (2013.01); *H01H 13/22* (2013.01); *H02J 50/20* (2016.02);
(Continued)

(58) Field of Classification Search
CPC ........ G05G 1/02; Y04S 20/227; H02K 35/02; H02K 7/1876; H01H 2013/026;
(Continued)

(56) References Cited

U.S. PATENT DOCUMENTS

| 2011/0063057 A1 | 3/2011 | Takahashi et al. |
| 2011/0063059 A1 | 3/2011 | Takahashi et al. |

(Continued)

FOREIGN PATENT DOCUMENTS

| CN | 102576628 A | 7/2012 |
| CN | 202311394 U | 7/2012 |

(Continued)

OTHER PUBLICATIONS

The extended European search report (EESR) dated Apr. 16, 2018 in a counterpart European Patent application, No. 17198108.7.

(Continued)

*Primary Examiner* — Jared Fureman
*Assistant Examiner* — Duc M Pham
(74) *Attorney, Agent, or Firm* — Metrolex IP Law Group, PLLC

(57) ABSTRACT

A wireless switch includes a cover member, a button member, a first plunger, a second plunger, a trigger spring, a return spring, a shaft, a housing, and a power generation module. An intermediate member constituted of the first plunger, the second plunger, the trigger spring, the return spring, and the shaft is connected between the button member and the power generation module. The intermediate member prevents a position of the shaft making contact with the power generating shaft of the power generation module from changing, and causes stress to build up in the trigger spring, until a movement distance of the button member reaches a predetermined distance. The intermediate member releases the stress built up in the trigger spring and pushes the power generation shaft with the shaft using the released stress upon the movement distance of the button member reaching the predetermined distance.

15 Claims, 7 Drawing Sheets

(51) Int. Cl.
*H02K 7/18* (2006.01)
*H01H 13/02* (2006.01)

(52) U.S. Cl.
CPC ........... *H02K 7/1876* (2013.01); *H02K 35/02* (2013.01); *H01H 2013/026* (2013.01); *H01H 2231/032* (2013.01); *H01H 2235/01* (2013.01); *H01H 2239/076* (2013.01); *H01H 2300/032* (2013.01); *Y02B 70/3241* (2013.01); *Y02B 90/224* (2013.01); *Y04S 20/14* (2013.01); *Y04S 20/227* (2013.01)

(58) Field of Classification Search
CPC ....... H01H 2239/076; H01H 2300/032; H01H 47/00; H01H 2231/032; H01H 2235/01; H01H 13/22; H02J 50/20; Y02B 70/3241; Y02B 90/224
See application file for complete search history.

(56) References Cited

U.S. PATENT DOCUMENTS

| | | | |
|---|---|---|---|
| 2012/0199454 A1* | 8/2012 | Guillot | H01H 9/168 200/302.1 |
| 2013/0113306 A1 | 5/2013 | Takahashi et al. | |
| 2014/0132090 A1 | 5/2014 | Takahashi et al. | |
| 2014/0306554 A1* | 10/2014 | Sugihara | H02K 35/00 310/12.12 |
| 2015/0318775 A1 | 11/2015 | Takahashi et al. | |

FOREIGN PATENT DOCUMENTS

| | | | | |
|---|---|---|---|---|
| CN | 102638256 A | 8/2012 | | |
| CN | 103629545 A | 3/2014 | | |
| CN | 105927489 A | 9/2016 | | |
| EP | 1109181 A2 | 6/2001 | | |
| JP | S62-210343 A | 9/1987 | | |
| JP | 2001-41545 A | 2/2001 | | |
| WO | 01/67580 A2 | 9/2001 | | |
| WO | WO-0167580 A2 * | 9/2001 | ............. | H01H 23/00 |

OTHER PUBLICATIONS

The extended European search report (EESR) dated Apr. 16, 2018 in a counterpart European Patent application, No. 17198085.7.
The Chinese office action letter dated Mar. 20, 2019 in a counterpart Chinese patent application.

* cited by examiner

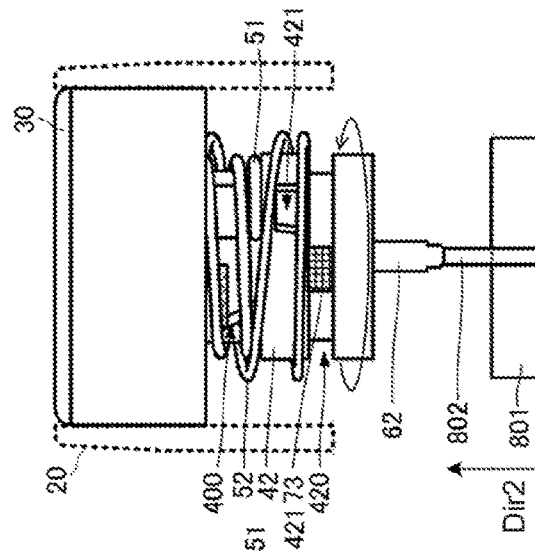
FIG. 4A
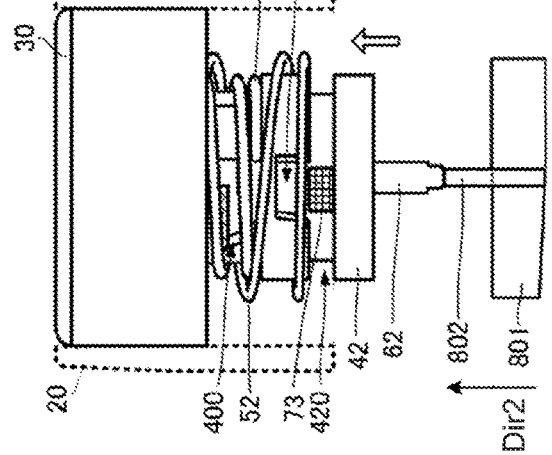
FIG. 4C
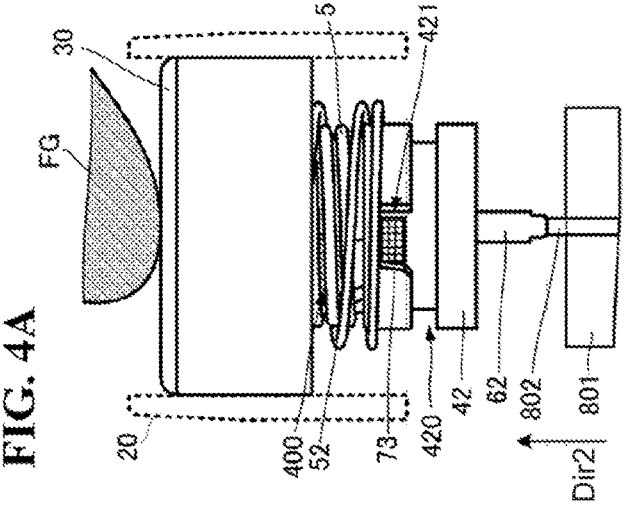
FIG. 4E
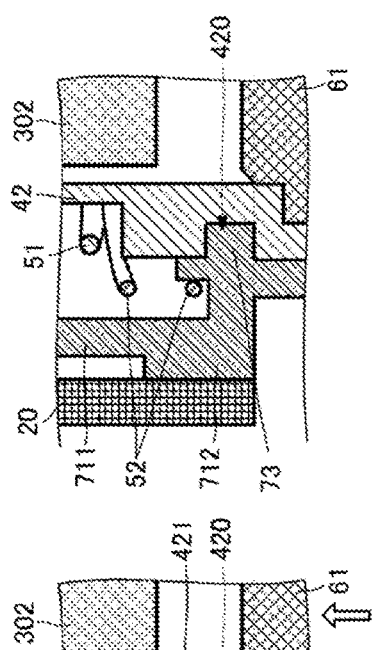
FIG. 4B
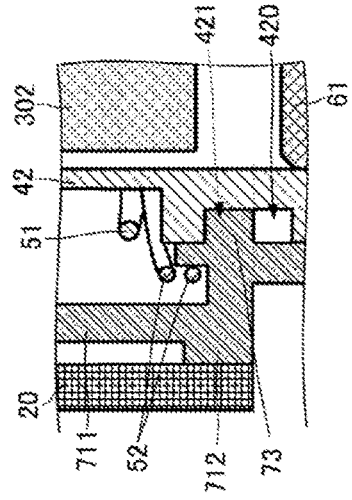
FIG. 4D
FIG. 4F

POWER GENERATION APPARATUS AND WIRELESS SWITCH

CROSS-REFERENCES TO RELATED APPLICATIONS

This application claims priority to Japanese Patent Application No. 2016-237418 filed Dec. 7, 2016, the entire contents of which are incorporated herein by reference.

FIELD

The disclosure relates to a power generation apparatus that generates power according to an operation made by an operator, and to a wireless switch including the power generation apparatus.

BACKGROUND

Various types of wireless apparatuses are currently in practical use. JP S62-210343A and JP 2001-41545A disclose remote control apparatuses, for example.

The remote control apparatuses disclosed in JP S62-210343A and JP 2001-41545A send wireless signals according to operations made by an operator to a main unit. Thus the remote control apparatuses disclosed in JP S62-210343A and JP 2001-41545A require power sources to transmit wireless signals.

A primary battery or a secondary battery is normally used as such a power source.

JP S62-210343A and JP 2001-41545A are examples of background art.

However, when a primary battery is used in a remote control apparatus, the battery must be replaced with a new primary battery once the discharge voltage drops below the minimum voltage for actual use.

Likewise, when a secondary battery is used in a remote control apparatus, the battery must be recharged once the discharge voltage drops below the minimum voltage for actual use.

Accordingly, one or more aspects may provide a power generation apparatus capable of obtaining an amount of generated power required for desired signal processing without requiring the use of a primary battery or a secondary battery, and to provide a wireless switch including such a power generation apparatus.

SUMMARY

A power generation apparatus according to one or more aspects includes a button member, a power generation module, and an intermediate member. The button member is mounted in a housing, and is configured to move in a first direction. The power generation module has a power generating shaft that moves as the button member moves, and is configured to generate power by the movement of the power generating shaft. The intermediate member is connected between the button member and the power generating shaft.

The intermediate member includes a first biasing member. The intermediate member prevents a position of a part making contact with the power generating shaft from changing, and causes stress to build up in the first biasing member, until a movement distance of the button member reaches a predetermined distance. The intermediate member releases the stress built up in the first biasing member and causes the part making contact with the power generating shaft to move toward the power generation module using the released stress upon the movement distance of the button member reaching the predetermined distance.

According to this configuration, the power generating shaft moves at a speed biased by the first biasing member once the movement distance of the button member reaches the predetermined distance, regardless of the speed at which an operator pushes the button member.

According to one or more aspects, an amount of generated power required for desired signal processing can be obtained.

BRIEF DESCRIPTION OF THE DRAWINGS

FIGS. 3A, 3C, and 3E are side views illustrating multiple states during a process of pushing in a button member, whereas FIGS. 3B, 3D, and 3F are partial enlarged side views corresponding to the states illustrated in FIGS. 3A, 3C, and 3E, respectively.

FIGS. 4A, 4C, and 4E are side views illustrating multiple states during a process of a button member returning, whereas FIGS. 4B, 4D, and 4F are partial enlarged side views corresponding to the states illustrated in FIGS. 4A, 4C, and 4E, respectively.

DETAILED DESCRIPTION

Figure 1:
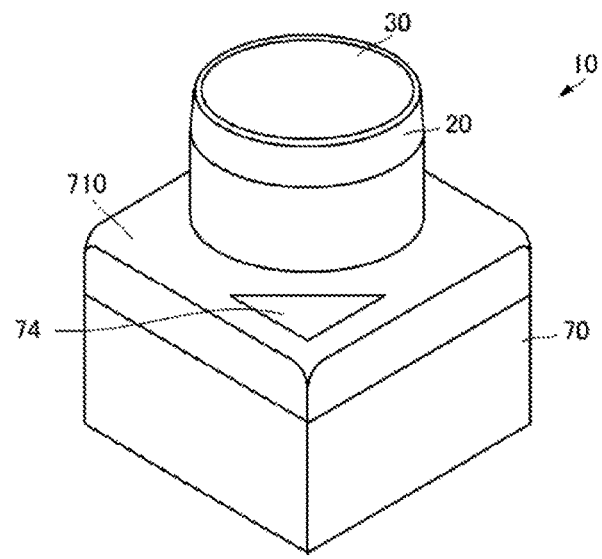
FIG. 1 is an external perspective view illustrating a wireless switch according to an embodiment.
Figure 2:
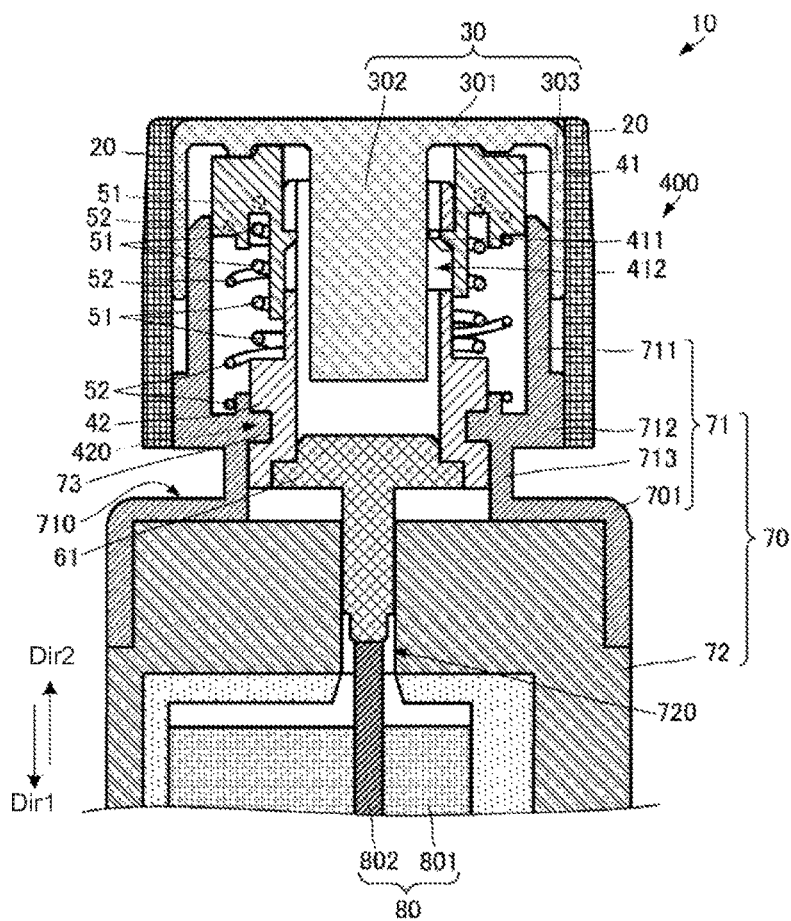
FIG. 2 is side cross-sectional view illustrating a power generation mechanism of a wireless switch according to an embodiment.
Figures 3A, 3B, 3C, 3D, 3E, 3F:
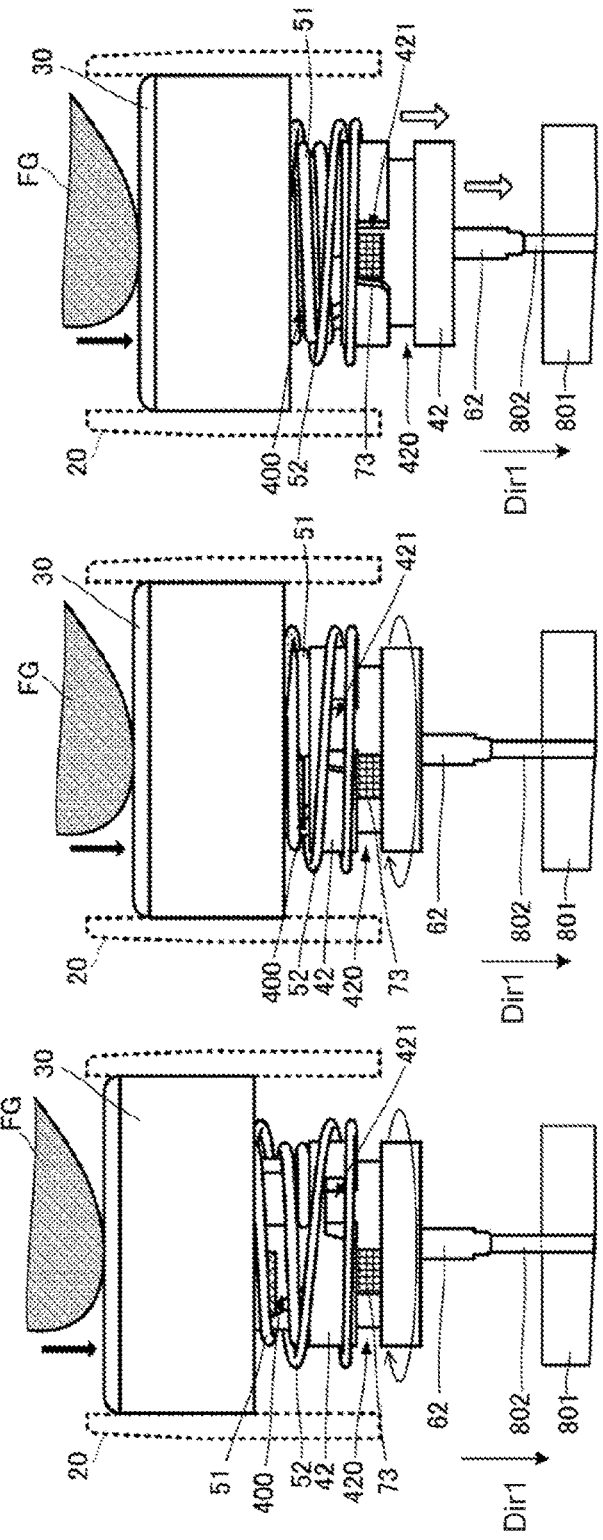

A power generation apparatus and a wireless switch according to an embodiment will be described with reference to the drawings. FIG. 1 is an external perspective view of the wireless switch according to an embodiment. FIG. 2 is side cross-sectional view of a power generation mechanism of the wireless switch according to an embodiment. FIGS. 3A, 3C, and 3E are side views illustrating multiple states during a process of pushing in a button member, whereas FIGS. 3B, 3D, and 3F are partial enlarged side views corresponding to the states illustrated in FIGS. 3A, 3C, and 3E, respectively. FIGS. 4A, 4C, and 4E are side views illustrating multiple states during a process of the button member returning, whereas FIGS. 4B, 4D, and 4F are partial enlarged side views corresponding to the states illustrated in FIGS. 4A, 4C, and 4E, respectively.

As illustrated in FIGS. 1 and 2, a wireless switch 10 includes a cover member 20, a button member 30, a first plunger 41, a second plunger 42, a trigger spring 51, a return spring 52, a shaft 61, a housing 70, and a power generation module 80. The first plunger 41, the second plunger 42, the trigger spring 51, and the return spring 52 correspond to an "intermediate member" according to one or more embodiments. The trigger spring 51 corresponds to a "first biasing member" according to one or more embodiments, and the return spring 52 corresponds to a "second biasing member" according to one or more embodiments.

As illustrated in FIG. 1, the button member 30 is arranged on a surface 710 side of the housing 70. Side surfaces of the button member 30 are covered by the cover member 20. The surface 710 of the housing 70 includes a light-transmissive portion 74.

As illustrated in FIG. 2, the housing 70 includes a support portion 71, a main body portion 72, and a projecting portion 73. The projecting portion 73 corresponds to a "stopping member" according to one or more embodiments.

The main body portion 72 has an outer shape of a predetermined size. For example, as illustrated in FIG. 1, the main body portion 72 has a substantially parallelepiped shape. The power generation module 80 is provided within the main body portion 72. A hole 720 parallel to a first direction Dir1 is formed in the main body portion 72, and communicates between a space containing the power generation module 80 and the exterior on the surface 710 side.

The power generation module 80 includes a power generation portion 801 and a power generation shaft 802. The power generation shaft 802 is partially inserted into a through-hole formed in the power generation portion 801. The power generation portion 801 produces electromotive force when the power generation shaft 802 moves into the through-hole, or in other words, when the amount by which the power generation shaft 802 is inserted into the through-hole changes. More specifically, the power generation module 80 uses electromagnetic induction. The amount of power generated changes with the movement speed of the power generation shaft 802, such that more power is generated the faster the movement speed is (see FIG. 5).

The power generation module 80 is arranged within the housing 70 such that the power generation shaft 802 is parallel to the first direction Dir1 (a direction orthogonal to the surface 710 of the housing 70). One end of the power generation shaft 802 in the direction in which the power generation shaft 802 extends is inserted into the hole 720.

Although not illustrated in the drawings, various functional parts of the wireless switch (described later with reference to FIG. 6) are also contained within the main body portion 72.

The support portion 71 includes a fixed member 701 attached to the main body portion 72, and a first member 711 and second member 712 arranged further outward than the surface 710 of the housing 70.

The first member 711 is a hollow cylinder. The first member 711 has a thick part and a thin part in an axial direction of the hollow cylinder, with the thick part arranged on the fixed member 701 side. The thick part and the thin part have the same inner diameter. In other words, the outer diameter of the thick part is greater than the outer diameter of the thin part.

The second member 712 is a disk having an opening in the center thereof. The second member 712 is arranged at an open face on the thick part side of the first member 711. The diameter of the opening in the second member 712 is smaller than the cylinder inner diameter of the first member 711. The second member 712 is connected to the fixed member 701 by a hollow cylindrical connecting part 713. The inner diameter of the connecting part 713 is substantially the same as the diameter of the opening in the second member 712.

An internal space of the first member 711, the opening in the second member 712, an internal space of the connecting part 713, and an opening in the fixed member 701 communicate. The opening in the fixed member 701 communicates with the hole 720 in the main body portion 72.

The projecting portion 73 has a substantially parallelepiped shape, is connected to a side surface of the second member 712 on the side thereof where the opening is formed in the center, and projects into the opening in the center from that side surface. The projecting portion 73 is fixed to the second member 712. For example, the projecting portion 73 is formed integrally with the second member 712, and furthermore, the projecting portion 73 is formed integrally with the support portion 71.

The cover member 20 is a hollow cylinder. The cover member 20 is arranged on an outer surface side of the first member 711 of the support portion 71. An inside surface of the cover member 20 is in contact with an outside surface of the thick part of the first member 711. As a result, a groove that is circular when viewed in plan view is formed between the inside surface of the cover member 20 and the outside surface of the thin part of the first member 711.

The button member 30 includes a surface member 301, a center member 302, and a side surface member 303. The surface member 301 is a disk, the center member 302 is a circular pillar, and the side surface member 303 is a hollow cylinder. The diameter of the center member 302 is smaller than the diameter of the surface member 301. The outer diameter of the side surface member 303 is the same as the diameter of the surface member 301, and the inner diameter of the side surface member 303 is greater than the diameter of the center member 302. The center member 302 and the side surface member 303 make contact with a rear surface of the surface member 301. The center member 302 is arranged in the center of the surface member 301 when viewed in plan view. The side surface member 303 has a shape that follows an outline (circumference) of the surface member 301 when viewed in plan view. With this shape, a cylindrical space having a predetermined thickness is formed between the center member 302 and the side surface member 303 on the rear surface side of the surface member 301. The side surface member 303 fits into a groove formed by the cover member 20 and the thin part of the first member 711. The groove has a shape that is deep in the first direction Dir1, and thus when the surface member 301 is pushed in from the surface side, the button member 30 moves in the first direction Dir1.

The first plunger 41 is arranged within a cylindrical space formed by the button member 30, the first member 711, and the second member 712. The first plunger 41 is a substantially hollow cylinder, and has a thick part and a thin part in an axial direction of the hollow cylinder. The axial direction of the first plunger 41 is parallel to the first direction Dir1.

The thick part is arranged on the button member 30 side, and the thin part is arranged on the housing 70 side (the second member 712 side). The inner diameter of the thick part and the inner diameter of the thin part are the same, whereas the outer diameter of the thick part is greater than the outer diameter of the thin part.

The surface of the thick part on the button member 30 side is in contact with the rear surface of the surface member 301 of the button member 30. An outside surface of the thick part is in contact with an inside surface of the first member 711.

The first plunger 41 includes a cam-use projection 411 that projects inward (toward the center of the hollow cylinder) at a predetermined position in the axial direction.

The second plunger 42 is arranged throughout a cylindrical space formed by the button member 30, the first member 711, and the second member 712, within the opening in the second member 712, and the internal space of the connecting part 713. The second plunger 42 is a substantially hollow cylinder, and has a thick part and a thin part in an axial direction of the hollow cylinder. The axial direction of the second plunger 42 is parallel to the first direction Dir1.

The thin part is arranged on the button member 30 side, and the thick part is arranged on the housing 70 side (the second member 712 side). The inner diameter of the thick part and the inner diameter of the thin part are the same, whereas the outer diameter of the thick part is greater than the outer diameter of the thin part.

The thick part is arranged throughout the cylindrical space formed by the button member 30, the first member 711, and the second member 712, within the opening in the second member 712, and the internal space of the connecting part 713.

A groove 420 is formed in a region of the thick part that overlaps the second member 712 in the first direction Dir1, as illustrated in FIGS. 3 and 4. The groove 420 has a shape that is recessed from the outside surface of the thick part and extends in the circumferential direction. The width (length in a direction orthogonal to the circumferential direction) and depth of the groove 420 are set to dimensions such that the projecting portion 73 of the housing 70 can fit within the groove 420.

Furthermore, a recessed part 421 is formed in the thick part, as illustrated in FIGS. 3 and 4. The recessed part 421 communicates with the groove 420 and is formed in a predetermined position in the circumferential direction. The recessed part 421 is formed having a size such that the projecting portion 73 can fit into the recessed part 421.

A part of the thin part on the side opposite from the side connected to the thick part is arranged between the center member 302 of the button member 30 and the first plunger 41. The outside surface of the part of the thin part arranged between the center member 302 and the first plunger 41 is in contact with the inside surface of the first plunger 41. A cam-use groove 412 is formed in the thin part. The cam-use groove 412 is formed passing through the thin part, at a predetermined angle that is neither parallel nor at a right angle to the axial direction, such as 45°. The aforementioned cam-use projection 411 of the first plunger 41 fits into this cam-use groove 412. This forms a cam 400 that transforms movement of the first plunger 41 along the first direction Dir1 into movement of the second plunger 42 in the circumferential direction.

The trigger spring 51 has a spiral shape. The trigger spring 51 is arranged within a cylindrical space formed by the first plunger 41, the second plunger 42, the first member 711, and the second member 712. The center axis of the spiral-shaped trigger spring 51 is parallel to the first direction Dir1. One end of the trigger spring 51 is fixed to the first plunger 41, and the other end is in contact with the surface of an outcropping in the second plunger 42, corresponding to a boundary between the thick part and the thin part of the second plunger 42.

The return spring 52 has a spiral shape. The return spring 52 is arranged within a cylindrical space formed by the first plunger 41, the second plunger 42, the first member 711, and the second member 712. The center axis of the spiral-shaped return spring 52 is parallel to the first direction Dir1. One end of the return spring 52 is fixed to the first plunger 41, and the other end is arranged on the inner side of, and is in contact with, a return spring groove formed in the second member 712.

The shaft 61 has a base part and a shaft part, where the base part is a disk and the shaft part is a circular pillar. The base part is fixed to an end surface of the second plunger 42 on the side opposite from the first plunger 41, or in other words, on the housing 70 side (the power generation module 80 side). The shaft part projects toward the housing 70 from the end surface of the second plunger 42 on the housing 70 side, and the direction in which the shaft part extends in parallel to the first direction Dir1. Part of the shaft part in the direction in which the shaft part extends is inserted into the hole 720 in the main body portion 72. A tip of the shaft part is in contact with an end part of the power generation shaft 802.

The wireless switch 10 configured in this manner generates power through the actions illustrated in FIGS. 3 and 4.

Power Generation During Button Operation

Power generation action when the button is operated will be described with reference to FIGS. 3A to 3F.

As illustrated in FIGS. 3A and 3B, when an operator (a finger FG in FIG. 3A, for example) pushes the button member 30 in, the button member 30 moves in the first direction Dir1 toward the housing 70 in accordance with the pushed amount. At this time, the projecting portion 73 of the housing 70 is in a location of the groove 420 in the second plunger 42 that does not communicate with the recessed part 421. Thus even if the button member 30 moves in the first direction Dir1, the second plunger 42 does not move in the first direction Dir1. Accordingly, the shaft 61 also does not move in the first direction Dir1 and does not push in the power generation shaft 802.

Because the button member 30 moves in the first direction Dir1 but the second plunger 42 does not move, the distance between the button member 30 and the second plunger 42 in the first direction Dir1 decreases. The first plunger 41 is in contact with the button member 30, and thus the first plunger 41 also moves in the first direction Dir1 as the button member 30 moves. The distance between the first plunger 41 and the second plunger 42 in the first direction Dir1 thus decreases.

Here, because the cam 400 is provided as described above, the second plunger 42 rotates, with the first direction Dir1 serving as the axis of rotation, in response to the first plunger 41 moving in the first direction Dir1. The projecting portion 73 moves in the circumferential direction within the groove 420 as a result.

Furthermore, when the first plunger 41 moves in the first direction Dir1 and the distance between the first plunger 41 and the second plunger 42 decreases, compressive stress builds up in the trigger spring 51. At this time, the distance between the first plunger 41 and the second member 712 also decreases, and thus stress builds up in the return spring 52 as well.

Next, as illustrated in FIGS. 3C and 3D, when the operator (the finger FG in FIG. 3C, for example) pushes the button member 30 further in, the button member 30 moves further in the first direction Dir1 toward the housing 70 in accordance with the pushed amount. At this time, the projecting portion 73 of the housing 70 is partially in a location of the groove 420 in the second plunger 42 that communicates with the recessed part 421, but the projecting portion 73 is not completely contained within the recessed part 421. Thus even if the button member 30 moves in the first direction Dir1, the second plunger 42 does not move in the first direction Dir1. Accordingly, the shaft 61 also does not move in the first direction Dir1 and does not push in the power generation shaft 802.

The second plunger 42 rotates further, with the first direction Dir1 serving as the axis of rotation. The projecting portion 73 moves further in the circumferential direction within the groove 420 as a result. Additionally, the distance between the first plunger 41 and the second plunger 42 decreases further, and thus more compressive stress builds up in the trigger spring 51. At this time, the distance between the first plunger 41 and the second member 712 also decreases further, and thus more stress builds up in the return spring 52 as well.

Next, as illustrated in FIGS. 3E and 3F, when the operator (the finger FG in FIG. 3E, for example) pushes the button member 30 further in, the button member 30 moves further in the first direction Dir1 toward the housing 70 in accordance with the pushed amount. Due to this movement, the second plunger 42 rotates further, and the projecting portion 73 aligns with the location of the groove 420 that communicates with the recessed part 421. The projecting portion 73 is thus not in contact with a wall surface of the groove 420 on the first plunger 41 side.

As described above, compressive stress acts in the trigger spring 51. Thus the stress in the trigger spring 51 is released when the projecting portion 73 separates from the wall surface of the groove 420 on the first plunger 41 side.

The button member 30 is being pushed by the operator, and thus a force produced by the trigger spring 51 expanding when the stress is released acts on the movement of the second plunger 42. The second plunger 42 moves toward the housing 70 as a result. As the second plunger 42 moves, the shaft 61 moves in the direction of the power generation shaft 802 and pushes in the power generation shaft 802. The power generation module 80 generates power as a result.

Here, the movement of the power generation shaft 802 arises due to the force produced by the trigger spring 51, and the expansion of the trigger spring 51 is produced instantly by the projecting portion 73 being contained in the recessed part 421. The movement speed of the power generation shaft 802 is thus constant, regardless of the speed at which the operator pushes the button. The power generation module 80 can thus generate power in a stable manner.

Furthermore, the movement of the second plunger 42 is biased by the trigger spring 51, and the release of the stress in the trigger spring 51 produced by this bias is instant, so that the power generation shaft 802 moves quickly. The amount of power generated by the power generation module 80 can therefore be increased.

Figure 5A:
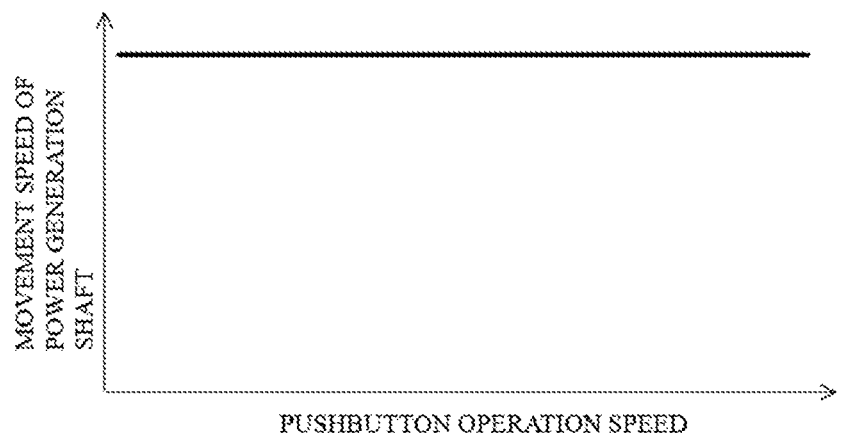
FIG. 5A is a graph illustrating a relationship between a pushing speed and a movement speed of a power generation shaft in the configuration according to an embodiment.
Figure 5B:
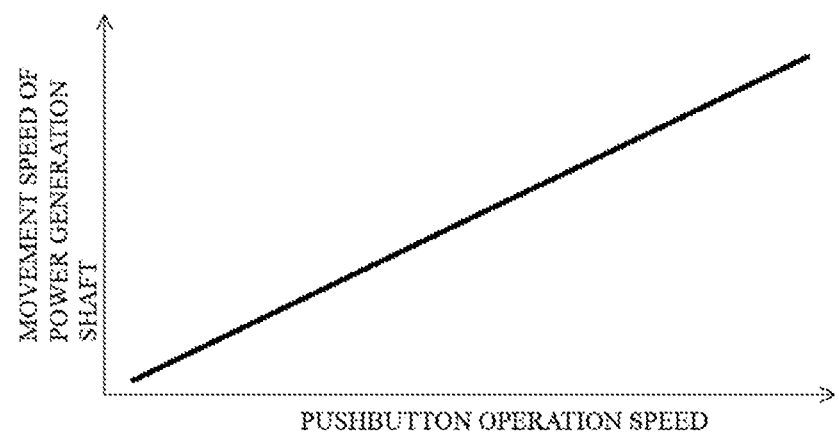
FIG. 5B is a graph illustrating a relationship between a pushing speed and a movement speed of a power generation shaft in a comparative example.

FIG. 5A is a graph illustrating a relationship between the pushing speed and the movement speed of the power generation shaft in the configuration according to an embodiment, and FIG. 5B is a graph illustrating a relationship between the pushing speed and the movement speed of a power generation shaft in a comparative example. The comparative example is a configuration in which a trigger spring is not used, and the movement speed of the power generating shaft changes depending on the pushing speed of the button member.

In the comparative example, the movement speed of the power generating shaft changes as the pushing speed of the button member changes, as illustrated in FIG. 5B. In other words, the amount of power generated changes as the pushing speed of the button member changes.

However, according to the configuration of an embodiment, the movement speed of the power generating shaft does not change even if the pushing speed of the button member changes, and thus a stable amount of power is generated, as illustrated in FIG. 5A. Furthermore, the movement speed of the power generating shaft is increased by the bias of the trigger spring 51, which increases the amount of power generated.

Thus by using the configuration of an embodiment, a large amount of power can be generated in a stable manner, regardless of the pushing speed, as long as the button is pushed in by a predetermined amount.

Power Generation When Button Returns

Power generation action when the button returns will be described with reference to FIGS. 4A to 4F.

As illustrated in FIGS. 4A and 4B, the projecting portion 73 remains contained within the recessed part 421 while the operator (the finger FG in FIG. 4A, for example) is pushing the button member 30.

Next, as illustrated in FIGS. 4C and 4D, when the operator stops pushing the button member 30, the stress acting in the return spring 52 is released, and the button member 30, the first plunger 41, and the second plunger 42 move away from the housing 70 (that is, in a second direction Dir2, which is the direction opposite from the first direction Dir1). The projecting portion 73 moves from the recessed part 421 into the groove 420 as a result.

Here, when the second plunger 42 moves, the shaft 61 also moves in the second direction Dir2, and the power generation shaft 802 moves as well. The power generation module 80 can therefore generate power during the return as well. Furthermore, the amount of power generated during the return can be increased by the bias of the return spring 52.

Next, as illustrated in FIGS. 4E and 4F, the button member 30, the first plunger 41, and the second plunger 42 move further in the second direction Dir2 due to the stress in the return spring 52. The above-described cam 400 is provided, and thus at this time, the second plunger 42 rotates in the opposite direction from when the button was pushed. The button returns to its steady state as a result.

Thus using the configuration according to an embodiment makes it possible to generate power both when the button member 30 is pushed and when the button member 30 returns.

Figure 6:
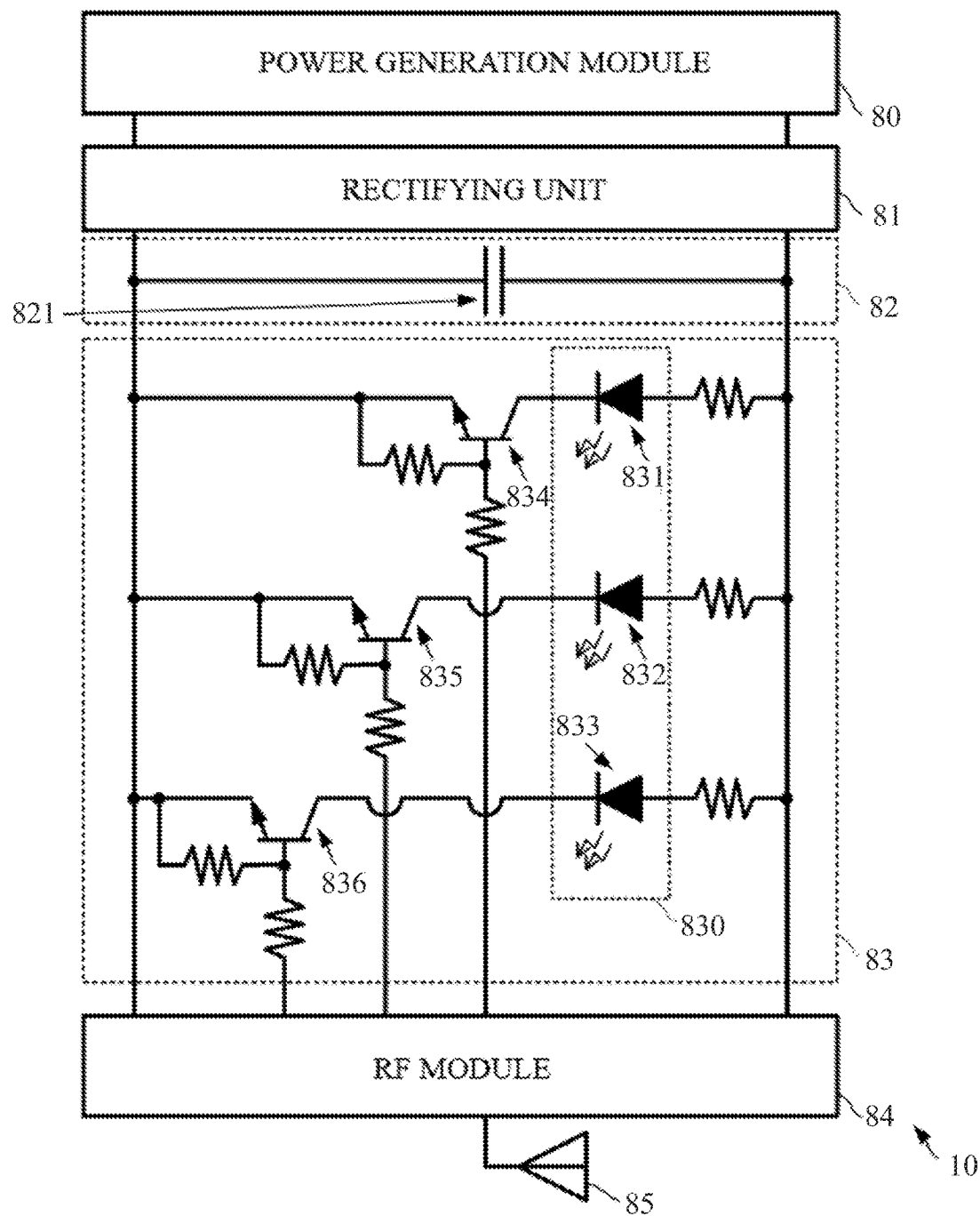
FIG. 6 is a circuit diagram illustrating a wireless switch according to an embodiment.

The wireless switch 10 having such a power generation mechanism has the circuit configuration illustrated in FIG. 6. FIG. 6 is a circuit diagram of the wireless switch according to an embodiment.

The wireless switch 10 includes the power generation module 80, a rectifying unit 81, a storage unit 82, a notification unit 83, an RF module 84, and an antenna 85.

The power generation module 80 is realized by the above-described configuration. The power generation module 80 is connected to the storage unit 82, the notification unit 83, and the RF module 84 via the rectifying unit 81.

The rectifying unit 81 is constituted of, for example, a rectifying device such as a diode connected to a signal line on the side opposite from a ground line. The rectifying unit 81 rectifies power (voltage, current) generated by the power generation module 80. Note that the rectifying unit 81 may be constituted of a half-wave rectifying circuit or a diode bridge circuit such as a full-wave rectifying circuit.

The storage unit 82 includes a capacitor 821. The storage unit 82 stores the power rectified by the rectifying unit 81.

The RF module 84 is electrified by the power generated by the power generation module 80, and using this electrification as a trigger, sends a switch signal to the exterior via the antenna 85. The "switch signal" is a signal indicating that the button member 30 has been pushed. The signal can be used a signal of a push-button switch in a factory automation (FA) system, for example.

Accordingly, the wireless switch 10 according to an embodiment can send the switch signal using the power generated by the pushing action of the switch, rather than using a primary battery or a secondary battery. At this time, the wireless switch 10 can generate a large amount of power in a stable manner as described above, and thus an amount of power required to send the switch signal can be reliably ensured. The wireless switch 10 can therefore transmit the switch signal in a reliable manner.

Furthermore, the wireless switch 10 has the following configuration for the notification unit 83.

The notification unit 83 includes a light emission module 830 and switching elements 834, 835, and 836. The light emission module 830 includes a plurality of light-emitting elements 831, 832, and 833. The light-emitting elements 831, 832, and 833 have different light emission states. For example, the light-emitting elements 831, 832, and 833 are light-emitting diodes that emit different colors of light. The switching elements 834, 835, and 836 are transistors, for example. In the notification unit 83, the lighting of the light-emitting elements 831, 832, and 833 is controlled by control signals issued to the switching elements 834, 835, and 836 from the RF module 84. For example, when an "on" control signal is inputted to the switching element 834, the switching element 834 conducts and the light-emitting element 831 lights. Likewise, when an "on" control signal is inputted to the switching element 835, the switching element 835 conducts and the light-emitting element 832 lights; and when an "on" control signal is inputted to the switching element 836, the switching element 836 conducts and the light-emitting element 833 lights. The light emitted from the light-emitting elements 831, 832, and 833 propagates to the exterior through the light-transmissive portion 74 in the housing 70 (see FIG. 1). This enables the operator to check the emitted light. The voltage driving the light-emitting elements 831, 832, and 833 at this time is supplied from the storage unit 82.

Figure 7A:
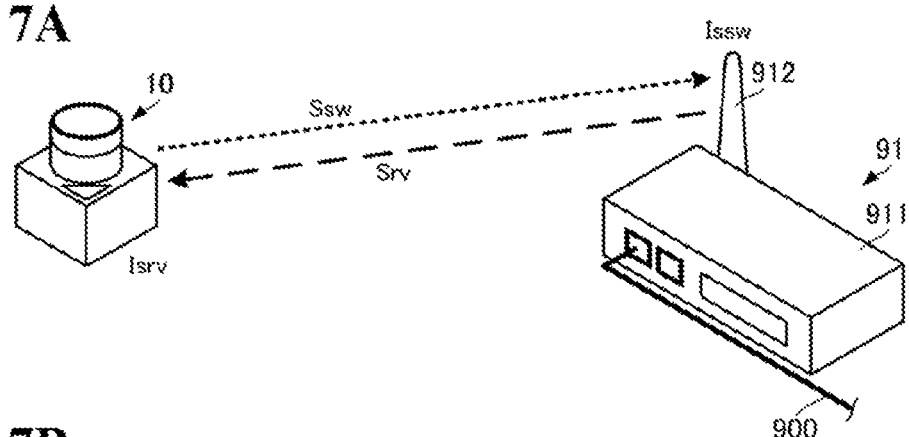
FIGS. 7A and 7B are diagrams illustrating the overall configuration of a switch signal transmission system using a wireless switch according to an embodiment.
Figure 7B:
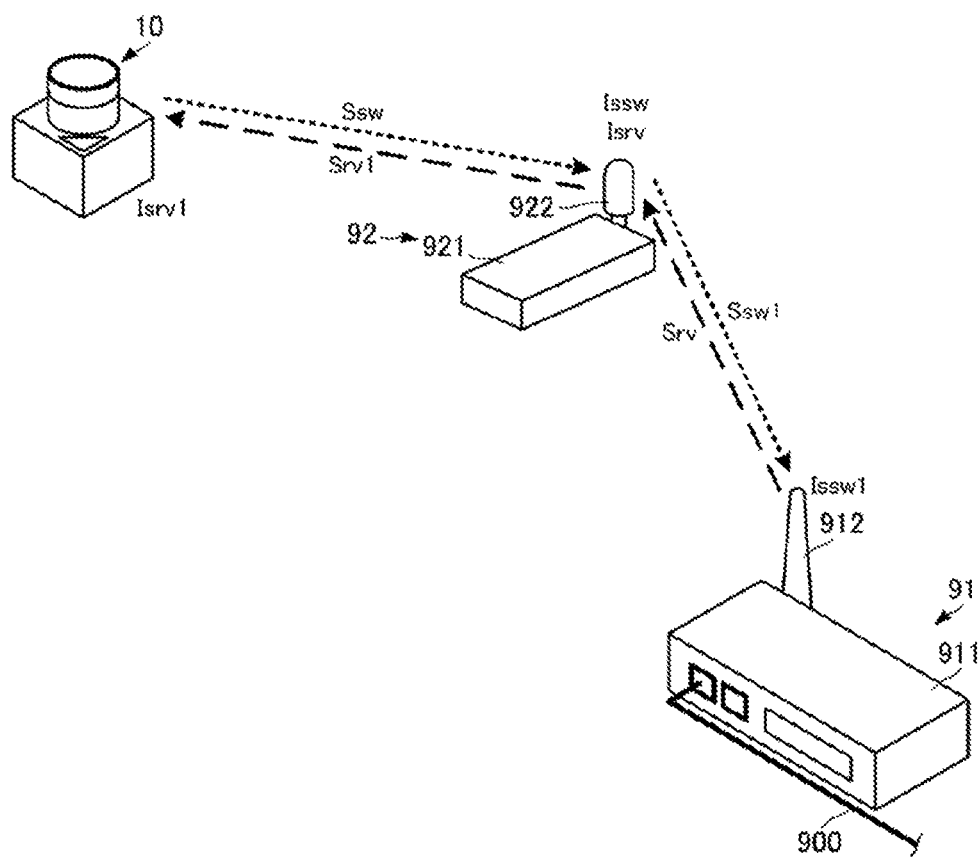

With this configuration, the wireless switch 10 can realize the following actions. FIGS. 7A and 7B are diagrams illustrating the overall configuration of a switch signal transmission system using the wireless switch according to an embodiment. FIG. 7A illustrates a system including a wireless switch and a base station, whereas FIG. 7B illustrates a system including a wireless switch, a repeater, and a base station.

The system illustrated in FIG. 7A includes the wireless switch 10 and a base station 91. The wireless switch 10 has the above-described mechanical and circuit configuration. The base station 91 includes a main unit 911 and an antenna 912. The main unit 911 is connected to a network of an FA system or the like by a communication cable 900 such as a LAN cable.

Upon being pushed by an operator, the wireless switch 10 transmits a switch signal Ssw. The antenna 912 of the base station 91 receives the switch signal Ssw, and the main unit 911 of the base station 91 transmits a signal indicating the reception of the switch signal Ssw to a predetermined device on the network (a Programmable Logic Controller (PLC), for example) via the communication cable 900.

The main unit 911 generates a reception confirmation signal Srv and transmits that signal via the antenna 912. At this time, the main unit 911 sets reception state data in the reception confirmation signal Srv. The "reception state data" is set on the basis of a signal strength Issw of the switch signal Ssw at the time of reception by the base station 91, and different details are set for when the signal strength Issw is greater than or equal to a strength threshold and when the signal strength Issw is less than the strength threshold. For example, if the signal strength Issw is greater than or equal to the strength threshold, a bit of the reception state data is set to 0, whereas if the signal strength Issw is less than the strength threshold, the bit of the reception state data is set to 1. The signal strength Issw is detected by the main unit 911 when the switch signal Ssw is received.

The wireless switch 10 receives the reception confirmation signal Srv. The wireless switch 10 executes control of the notification unit 83 in accordance with whether or not a signal strength Isrv of the reception confirmation signal Srv is greater than or equal to a strength threshold and the details (bit) of the reception state data. Specifically, the RF module 84 of the wireless switch 10 selectively causes one of the light-emitting elements 831, 832, and 833 to light in accordance with whether or not the signal strength Isrv of the reception confirmation signal Srv is greater than or equal to the strength threshold and the details (bit) of the reception state data.

To be even more specific, the wireless switch 10 executes the following processing. If the signal strength Isrv of the reception confirmation signal Srv is greater than or equal to the strength threshold and the bit of the reception state data is 0, the RF module 84 causes the light-emitting element 831 to light but does not cause the light-emitting elements 832 and 833 to light. If the signal strength Isrv of the reception confirmation signal Srv is less than the strength threshold or the bit of the reception state data is 1, the RF module 84 causes the light-emitting element 832 to light but does not cause the light-emitting elements 831 and 833 to light. Furthermore, the RF module 84 measures the time from when the switch signal Ssw is transmitted, and if the reception confirmation signal Srv is not received within a predetermined amount of time following the start of the measurement (that is, following the transmission of the switch signal Ssw), causes the light-emitting element 833 to light but does not cause the light-emitting elements 831 and 832 to light.

By executing such processing, the operator can reliably ascertain whether or not the base station 91 has received the switch signal Ssw. Furthermore, the operator can ascertain whether the strength of the wireless signal is greater than or equal to a predetermined signal strength, or in other words, the reliability of the wireless communication.

By including the above-described power generation module 80 and storage unit 82, the wireless switch 10 can receive the reception confirmation signal Srv and control the notification unit 83 without using a primary battery or a secondary battery.

Figure 8:
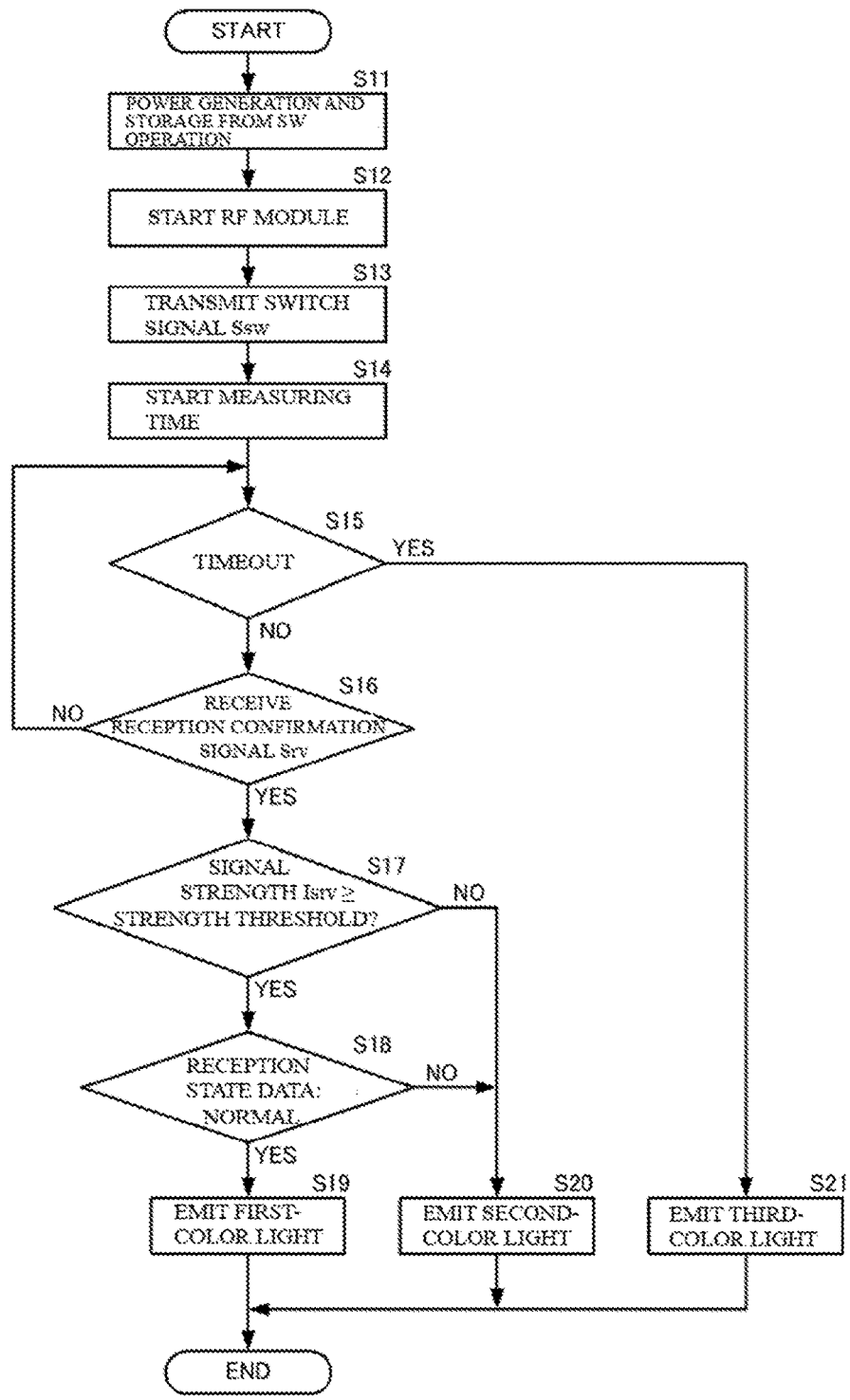
FIG. 8 is a flowchart illustrating processing of a wireless switch according to an embodiment.

Processing performed by the wireless switch 10, including such processing performed by the RF module 84, can be realized through the flow illustrated in FIG. 8. FIG. 8 is a flowchart illustrating processing of the wireless switch according to an embodiment.

By having the above-described configuration, the wireless switch 10 generates and stores power through switch operations (the action of the button member 30 being pushed) (S11).

The RF module 84 of the wireless switch 10 is started by this generated power (S12). The RF module 84 transmits the switch signal Ssw in response to being started (S13). The RF module 84 starts measuring time when the switch signal Ssw is transmitted (S14).

If the measured time has reached a timeout time (S15: YES), the RF module 84 causes third-color light to be emitted by causing the light-emitting element 833 to emit light (S21). If the measured time has not reached the timeout time (S15: NO), the RF module 84 enters a state of standing by for the reception of the reception confirmation signal Srv. If the reception confirmation signal Srv has not been received (S16: NO), the RF module 84 continues measuring time.

Once the reception confirmation signal Srv is received (S16: YES), the RF module 84 detects the signal strength Isrv. If the signal strength Isrv is less than the strength threshold (S17: NO), the RF module 84 causes second-color light to be emitted by causing the light-emitting element 832 to emit light (S20). If the signal strength Isrv is greater than or equal to the strength threshold (S17: YES), the RF module 84 demodulates the reception state data.

If the reception state data is normal (that is, if the aforementioned bit of the reception state data is 0), the RF module 84 causes first-color light to be emitted by causing the light-emitting element 831 to emit light (S19). However, if the reception state data is not normal (that is, if the aforementioned bit of the reception state data is 1), the RF module 84 causes the second-color light to be emitted by causing the light-emitting element 832 to emit light (S20).

The above-described processing can also be implemented in a situation where a repeater 92 is included, as illustrated in FIG. 7B. The system illustrated in FIG. 7B includes the wireless switch 10, the base station 91, and the repeater 92. The repeater 92 includes a main unit 921 and an antenna 922.

Upon being pushed by an operator, the wireless switch 10 transmits a switch signal Ssw. The antenna 922 of the repeater 92 receives the switch signal Ssw, and the main unit 921 detects the reception signal strength Issw. The main unit 921 generates the reception state data, in the same manner as the base station 91 described above, on the basis of the signal strength Issw. The main unit 921 generates a repeater switch signal Ssw1 including the reception state data, and transmits that signal from the antenna 922.

The antenna 912 of the base station 91 receives the repeater switch signal Ssw1, and the main unit 911 detects a reception signal strength Issw1. The main unit 911 updates the reception state data, according to the same principle as the base station 91 described above, on the basis of the signal strength Issw1. The main unit 911 generates the reception confirmation signal Srv including the reception state data, and transmits that signal from the antenna 912. The updated reception state data is used in the reception confirmation signal Srv.

The antenna 922 of the repeater 92 receives the reception confirmation signal Srv, and the main unit 921 detects the reception signal strength Isrv. The main unit 921 updates the reception state data, according to the same principle as the base station 91 described above, on the basis of the signal strength Isrv. The main unit 921 generates a repeater reception confirmation signal Srv1 including the updated reception state data, and transmits that signal from the antenna 922.

The wireless switch 10 receives the repeater reception confirmation signal Srv1. The wireless switch 10 executes control of the notification unit 83 as described above in accordance with whether or not a signal strength Isrv1 of the repeater reception confirmation signal Srv1 is greater than or equal to the strength threshold and the details (bit) of the reception state data.

By executing such processing, the operator can reliably ascertain whether or not the base station 91 has received the switch signal Ssw, even with wireless communication through the repeater 92. Furthermore, the operator can ascertain whether the strength of the wireless signal is greater than or equal to a predetermined signal strength, or in other words, the reliability of the wireless communication.

The foregoing describes a configuration in which the power generating shaft is moved at a constant speed that is unaffected by the power generating shaft, by the movement of the projecting portion 73 relative to the groove 420 and the recessed part 421 of the second plunger 42 and the action and bias of the trigger spring 51. However, the above-described power generation mechanism can also be realized using a configuration in which a mechanism that does not move the shaft 61 (the power generation shaft 802) until a predetermined pushing amount (for example, a mechanism that temporarily stops the movement on the basis of the engagement of one structure with another structure) and a mechanism that produces a predetermined bias upon the predetermined pushing amount being reached and then moves the shaft 61 (the power generation shaft 802) (for example, a mechanism that uses air pressure or the like) are arranged between the button member and a power generation module as intermediate members.

Furthermore, although the foregoing describes a configuration including the return spring 52, it is acceptable for the trigger spring 51 to be included at the minimum. However, including the return spring 52 is useful because the return spring 52 improves the rate of power generation.

Furthermore, although the foregoing describes a situation in which the light-emitting elements emit different colors of light, patterns of light emission may be varied instead. In this case, a minimum of only one light-emitting element is necessary.

Furthermore, although the foregoing describes using light-emitting elements as the notification unit, the operator may be notified in a different way instead. For example, a sound-emitting element such as a buzzer can be used as the notification unit. Multiple types of elements can be used for the notification as well. For example, sound and light may be used. However, light-emitting elements using light-emitting diodes consume little power can be emit light with a small amount of power, and are thus more useful in the configuration described in an embodiment.

Furthermore, although the foregoing describes using generated power to transmit and receive switch signals, the generated power can be used in other signal processing as well. For example, a power generating unit having the above-described configuration may be provided, and power generated by the power generating unit can also be used to transmit signals including various types of stored information and the like.

The invention claimed is:

1. A power generation apparatus comprising:
   a button, mounted in a housing and configured to move in a first direction;
   a power generation module comprising a power generating shaft that moves as the button moves, the power generation module configured to generate power by the movement of the power generating shaft; and
   an intermediate member connected between the button and the power generating shaft, the intermediate member comprising:
   a first biasing member;
   a first plunger configured to contact a power generation module side of the button and to move in the first direction as the button moves in the first direction; and
   a second plunger arranged between the first plunger and the power generation module and coupled to the power generating shaft, the second plunger configured to engage with the first biasing member and to move in the first direction, wherein
   the intermediate member is configured such that:
   a position of the second plunger is prevented from changing, causing stress to be built up in the first biasing member, until a movement distance of the button reaches a predetermined distance; and in response to the movement distance of the button reaching the predetermined distance, the stress built up in the first biasing member is released, causing the second plunger to move toward the power generation module.

2. The power generation apparatus according to claim 1, wherein:

the first biasing member comprises a trigger spring having a spiral shape, the trigger spring arranged on a power generation module side of the first plunger, one end of the trigger spring making contact with the first plunger and another end of the trigger spring making contact with the second plunger;

the second plunger is configured to rotate with the first direction serving as an axis of rotation; and the second plunger comprises:

a groove, formed along a direction of the rotation, the groove configured such that a stopping member connected to the housing moves within the groove.

3. The power generation apparatus according to claim 2, wherein the intermediate member comprises a second biasing member arranged between the button and the housing, the second biasing member configured to bias in a second direction opposite from the first direction.

4. The power generation apparatus according to claim 3, wherein the second biasing member comprises a return spring having a spiral shape.

5. A wireless switch comprising:

the power generation apparatus according to claim 4; and an RF module, connected to the power generation apparatus, configured to transmit a switch signal using power generated by the power generation apparatus.

6. A wireless switch comprising:

the power generation apparatus according to claim 3; and an RF module, connected to the power generation apparatus, configured to transmit a switch signal using power generated by the power generation apparatus.

7. A wireless switch comprising:

the power generation apparatus according to claim 2; and an RF module, connected to the power generation apparatus, configured to transmit a switch signal using power generated by the power generation apparatus.

8. The power generation apparatus according to claim 1, wherein the intermediate member comprises a second biasing member arranged between the button and the housing, the second biasing member configured to bias in a second direction opposite from the first direction.

9. The power generation apparatus according to claim 8, wherein the second biasing member comprises a return spring having a spiral shape.

10. A wireless switch comprising:

the power generation apparatus according to claim 9; and an RF module, connected to the power generation apparatus, configured to transmit a switch signal using power generated by the power generation apparatus.

11. A wireless switch comprising:

the power generation apparatus according to claim 8; and an RF module, connected to the power generation apparatus, configured to transmit a switch signal using power generated by the power generation apparatus.

12. A wireless switch comprising:

the power generation apparatus according to claim 1; and an RF module, connected to the power generation apparatus, configured to transmit a switch signal using power generated by the power generation apparatus.

13. The wireless switch according to claim 12, further comprising:

a notification unit configured to operate using power generated by the power generation apparatus, wherein the RF module controls the notification unit in one or more notification states according to a strength or details of a reception state signal corresponding to the switch signal.

14. The wireless switch according to claim 13, further comprising:

a storage unit configured to store power generated by the power generation apparatus, wherein the RF module receives the reception state signal using power supplied from the storage unit.

15. The wireless switch according to claim 14, wherein power for the notification unit is supplied by the storage unit.

* * * * *